United States Patent [19]

Ito et al.

[11] Patent Number: 4,596,138
[45] Date of Patent: Jun. 24, 1986

[54] MEASURING APPARATUS FOR INTERNAL COMBUSTION ENGINE

[75] Inventors: Katsunori Ito, Aichi; Susumu Akiyama, Kariya; Tiaki Mizuno, Toyota; Toshitaka Yamada; Tomoaki Abe, both of Nagoya, all of Japan

[73] Assignee: Nippondenso Co., Ltd., Kariya, Japan

[21] Appl. No.: 721,182

[22] Filed: Apr. 8, 1985

[30] Foreign Application Priority Data

Apr. 11, 1984 [JP] Japan .................. 59-72187

[51] Int. Cl.⁴ .......................... G01M 15/00
[52] U.S. Cl. ........................ 73/118; 73/204
[58] Field of Search ............ 73/118, 204; 123/494

[56] References Cited

U.S. PATENT DOCUMENTS

| | | | |
|---|---|---|---|
| 4,322,970 | 4/1982 | Peter | 73/118 |
| 4,341,114 | 7/1982 | Plapp | 73/118 |
| 4,420,971 | 12/1983 | Rapps et al. | 73/118 |

Primary Examiner—Jerry W. Myracle
Attorney, Agent, or Firm—Cushman, Darby & Cushman

[57] ABSTRACT

The intake airflow rate supplied to an internal combustion engine is measured and an obtained airflow rate measurement signal is used for detecting the operating state of the internal combustion engine. The internal combustion engine is electronically controlled, and an airflow rate measuring unit includes a heat-generating element having a temperature-resistance characteristic. A heating current which rises in correspondence with a signal synchronous with rotation of the engine is supplied to the heat-generating element. The heating current is controlled to rise when the heat-generating element is heated to a predetermined temperature, and the heating current duration indicates the airflow rate measurement signal. A burn-off command signal is generated so as to burn off dust attached to the heat-generating element. The command signal is used to generate a periodic signal having a preset effective duration. The pulse signal sets a continuous supply of the heating current to the element for the pulse duration, so that the heat-generating element is heated to a temperature for burning off dust attached thereto.

9 Claims, 13 Drawing Figures

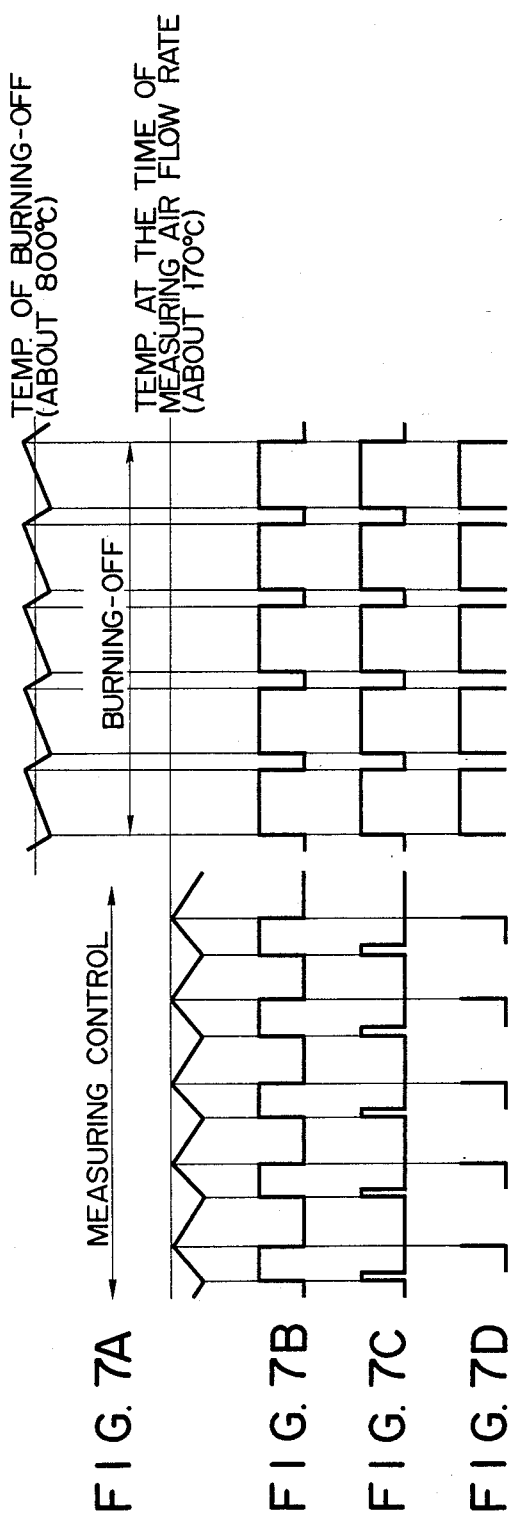

MEASURING APPARATUS FOR INTERNAL COMBUSTION ENGINE

BACKGROUND OF THE INVENTION

The present invention relates to a control apparatus for controlling a measuring unit of an internal combustion engine wherein an intake airflow rate in an intake pipe of the engine is measured with a heat-wire type airflow rate measuring unit and the measurement signal obtained is used as a signal for detecting the operating state of the engine and, more particularly, to a control apparatus wherein dust attached to a heat-wire type heat-generating element used as a measuring element of the measuring unit is effectively burned off so that airflow rate measurement precision is improved.

When an internal combustion engine is electronically controlled, the operating state of the engine is monitored. A signal corresponding to the operating state is detected. The fuel injection quantity, ignition timing or the like is calculated in accordance with the detection signal and operation control of the engine is thus performed.

The monitor means for monitoring the operating state of an internal combustion engine includes a rotational speed sensor for the engine, an exhaust gas temperature sensor, and a throttle opening sensor. Among various sensors, an intake airflow rate measuring unit is directly related to the operating state of the engine. An airflow rate sensor using a heat wire is known as one type of intake airflow rate measuring unit. In this sensor, a heat-generating element with a controlled heat-generating function is arranged in an intake pipe. Changes in temperature of the heat-generating element which correspond to the airflow rate are measured.

The heat-generating element used in such a heat-wire type airflow rate measuring unit comprises a resistive element which changes its resistance in accordance with a change in temperature. A heating current is supplied to the resistive element so that the element heats to a predetermined temperature. In this case, the amount of heat generated by the element is changed in accordance with the rate of air flowing in the intake pipe. Therefore, the airflow intake rate can be measured by monitoring the temperature of the heat-generating element in accordance with the heating current and the resistance of the heat-generating element.

However, in such a heat-wire type airflow rate measuring unit, when the heat-generating element is exposed in an airflow for a long period of time for measurement purpose, dust in the air deposits on the element and the thermal conductivity of the element is unavoidably changed. In such a state, a change in resistance of the element does not correctly reflect an airflow rate, and the airflow rate measurement signal includes an error component.

In view of this problem, it has been proposed to burn off the dust attaching to the element by increasing the heating temperature of the heat-generating element. As described in Japanese Patent Disclosure No. 54-76182, for example, the equivalent conditions of a bridge circuit connected to the heat-generating element are changed so as to increase the preset heating temperature of the element. However, since the constants of constituent elements of the bridge circuit for monitoring the temperature of the heat-generating element must be changed for this purpose, a circuit and a signal line are required. This results in an adverse effect on the measuring circuit due to unstable factors such as noise and in a low measurement precision of the airflow rate.

SUMMARY OF THE INVENTION

It is an object of the present invention to provide a control apparatus for an internal combustion engine, wherein a measurement precision of an airflow rate measuring unit used as a means for detecting the operating state of the engine is set in a stable state for a long period of time, stable measurement of the intake airflow rate is performed, and electronic control of the engine is stably and accurately performed.

It is another object of the present invention to provide a control apparatus for an internal combustion engine wherein a unit for measuring the intake air flow rate comprises a heat-wire type air flow rate sensor which generates a measurement signal corresponding to an airflow rate and compatible with an electronic control unit, and when dust in the air deposits on a heat-generating element constituting the sensor, it is effectively burned off so that the thermal conductivity of the sensor is stably kept at a desired value and the engine is controlled with high stability.

It is still another object of the present invention to provide a control apparatus for an internal combustion engine wherein the circuit configuration for the purpose of burning off dust deposited on the heat-generating element is simplified and measurement error is reduced to a minimum.

In the control apparatus for an internal combustion engine according to the present invention, a heat-wire type airflow rate sensor is used as a means for measuring the intake air flow rate to detect the operating state of the engine. A pulsating heating current of fixed duration is supplied to a heat-generating element constituting the sensor so as to control the heat-generating operation of the element. In this case, when the heat-generating element reaches a predetermined temperature, the heating current is turned off, and the airflow rate measurement is represented by the time duration of the pulsating heating current. In addition, the time duration of the heating current supplied to the heat-generating element is controlled to be relatively long during burn-off control as compared to that during measurement regardless of the temperature of the element. Thus, the heat-generating element is heated to a high temperature and dust deposited thereon is burnt away.

With the apparatus of the above construction, in a stop or idling state of the internal combustion engine, a burn-off command for burning off dust deposited on the heat-generating element is generated and it is removed in response to this command. Therefore, dust which impairs the thermal conductivity of the heat-generating element constituting the airflow rate measuring sensor does not remain deposited on the element. The heat-radiating effect of the heat-generating element is set in a state corresponding to the airflow rate in the intake air pipe, so that stable airflow rate measurement and electronic control of the internal combustion engine can be constantly performed with high precision.

BRIEF DESCRIPTION OF THE DRAWINGS

FIGS. 7A to 7D are timing charts showing the operation in response to a burn-off command supplied to the heat-generating element together with an airflow rate measurement state.

DETAILED DESCRIPTION OF THE PREFERRED EMBODIMENT

Figure 1:
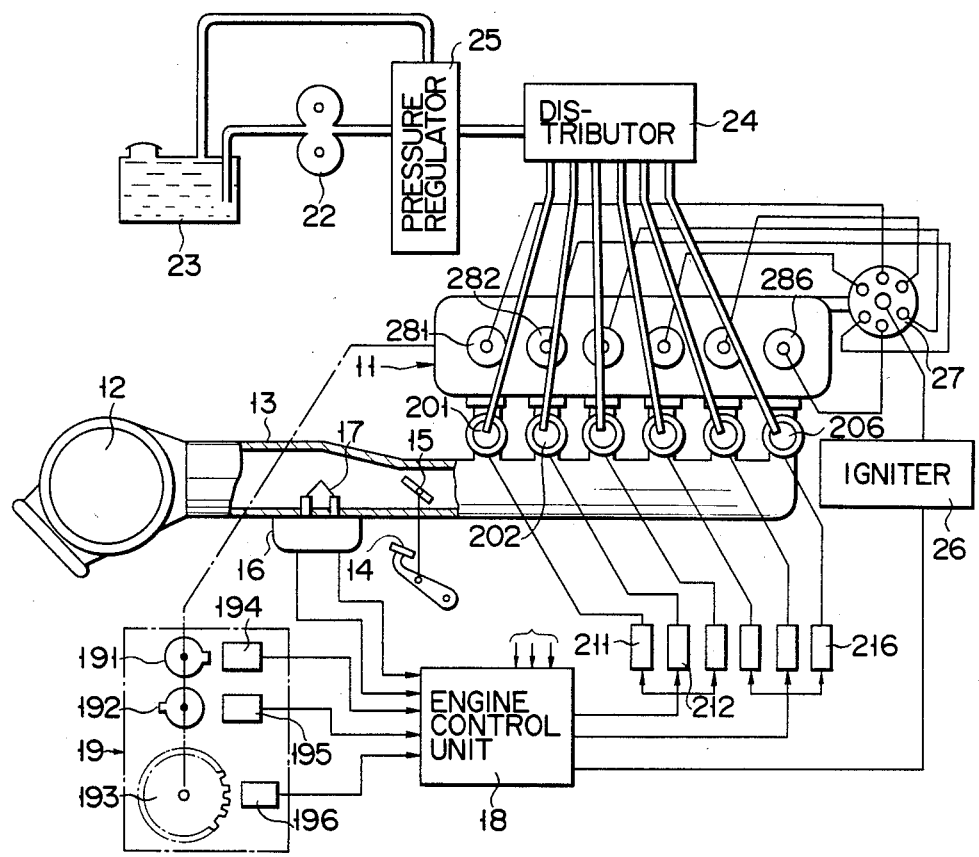
FIG. 1 shows the system configuration of a control apparatus for an internal combustion engine according to an embodiment of the present invention.

FIG. 1 shows the configuration of a control system for an engine 11 mounted on a vehicle. In this control system, the fuel injection quantity, ignition timing and the like are electronically controlled in accordance with the operating state of the engine 11.

Air is taken into the engine 11 through an air filter 12 and is guided to each cylinder via an intake pipe 13. A throttle valve 15 driven by an acceleration pedal 14 is arranged in the intake pipe 13. The amount of air corresponding to the opening of the throttle valve 15 is supplied to the engine 11.

A heat-generating element 17 constituting an airflow rate measuring unit 16 is arranged inside the pipe 13. The element 17 is controlled by a current supplied thereto and comprises a resistive element having temperature characteristics such that the resistance changes in accordance with its temperature. The element 17 thus comprises a heater consisting of, for example, a platinum wire. An airflow rate measurement signal from the unit 16 is supplied to an engine control unit 18 which comprises a microcomputer and includes an engine control processor. A heating current is supplied to the element 17 in accordance with an instruction from the unit 18.

The engine control unit 18 receives a detection signal from a rotational speed detector 19, an opening detection signal of the throttle valve 15, a cooling water temperature detection signal of the engine 11, an air-fuel ratio detection signal and the like as the operating state detection signals of the engine 11. In response to these detection signals, the control unit 18 calculates an optimum fuel injection quantity for the current operating state of the engine 11 and supplies a calculated fuel injection period setting signal to injectors 201 to 206 arranged in correspondence with the respective cylinders of the engine 11. Thus, the injection valve opening duration are controlled to set the fuel injection quantity.

The fuel injection quantity setting signal is a pulse signal having a preset duty ratio. The pulse signal is applied through resistors 211 to 216. The injectors 201 to 206 are controlled by the preset duration of this signal.

The rotational speed detector 19 has cams 191 and 192 coaxially driven with the engine 11, a rotary disk 193 with a number of teeth, and electromagnetic pickups 194 to 196 opposed to the cams 191 and 192 and the disk 193. The pickups 194 to 196 generate an angle signal corresponding to a specific rotational angle of the engine 11, and signals for counting the number of teeth of the disk 193.

Fuel supplied from a fuel tank 23 by a fuel pump 22 is supplied through a distributor 24 to the injectors 201 to 206 arranged for the respective cylinders of the engine 11. The pressure of fuel supplied to the fuel distributor 24 is controlled to be constant by a pressure regulator 25, so that the fuel injection quantity is controlled correctly in accordance with the valve opening duration described above.

The engine control unit 18 supplies a command to the igniter 26. In response to this command, the igniter 26 distributes an ignition signal through a distributor 27 to ignition coils 281 to 286 arranged for the respective cylinders. The ignition timing suitable to the operating state of the engine 11 is set, and operation control of the engine 11 is performed accordingly.

Figure 2:
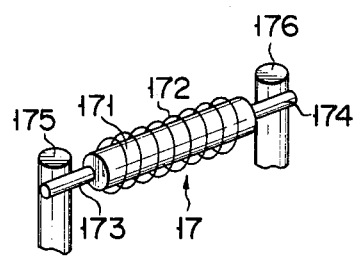
FIGS. 2 and 3 are diagrams respectively showing examples of a heat-generating element constituting an intake airflow rate measuring unit used in the control apparatus shown in FIG. 1.

FIG. 2 shows the heat-generating element 17 of the airflow rate measuring unit 16 used in the control apparatus for an internal combustion engine as described above. A platinum resistive wire 172 having a temperature characteristic is wound around a ceramic bobbin 171. Shafts 173 and 174 as support shafts project from the ends of the bobbin 171. The shafts 173 and 174 are supported by pins 175 and 176 of a electrical conductor. A heating current for the resistive wire 172 flows through the pins 175 and 176.

Figure 3:
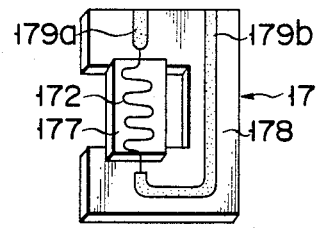

FIG. 3 shows another example of the heat-generating element 17. In this case, a resistive wire 172 having a temperature characteristic is formed on an insulating film 177. The film 177 is supported by an insulating substrate 178. Wiring layers 179a and 179b are formed on the surface of the substrate 178 to be connected to the resistive wire 172 so as to supply a heating current to the resistive wire 172.

Figure 4:
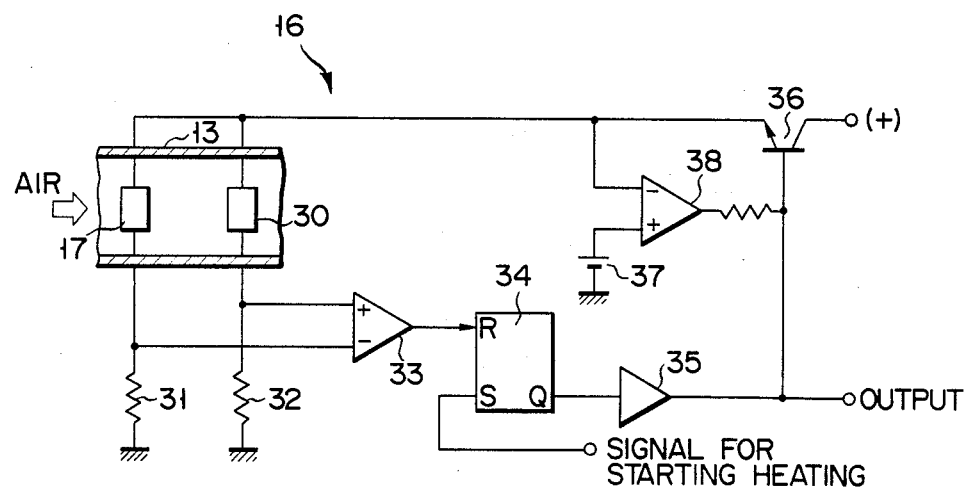
FIG. 4 is a circuit diagram of the airflow rate measuring unit shown in FIG. 1.

FIG. 4 shows the circuit configuration of the airflow rate measuring unit 16. The heat-generating element 17 is fixed inside the intake pipe 13. A temperature sensitive element 30 is also fixed inside the pipe 13. The element 30 comprises a platinum resistive wire which has a temperature characteristic according to which the resistance changes in accordance with temperature as in the case of the heat-generating element 17. Thus, the element 30 changes its resistance in accordance with the temperature of the air passing through the pipe 13 and therefore serves as an air temperature measuring means. Fixed resistors 31 and 32 are respectively connected to the elements 17 and 30 so as to constitute a bridge circuit. A node a of the element 17 and the resistor 31 and a node b of the element 30 and the resistor 32 as the output terminals of the bridge circuit are connected to the input terminals of a comparator 33 so as to monitor the temperature change of the element 17.

When a heating current is supplied to the element 17 and the element 17 is heated to a degree such that the temperature difference with respect to the air temperature detected by the element 30 has reached a predetermined value, the output signal from the comparator 33 rises. The "1" output signal from the comparator 33 resets a flip-flop circuit 34.

The flip-flop circuit 34 is set by a heating start signal generated by the unit 18 in correspondence with a rotation sync signal from the detector 19, synchronous with rotation of the engine 11. Thus, the flip-flop circuit 34 is set by the heating start signal generated in accordance with the specific rotational angle of the engine 11 and is reset when the element 17 is heated to a predetermined temperature. The circuit 34 generates pulse signals having a duration corresponding to this set/reset operation.

The set output signal of the predetermined duration from the circuit 34 is obtained as a duration-controlled output signal through a buffer amplifier 35 and is applied to the base electrode of a transistor 36 to intermittently control a power source for the bridge circuit including the element 17 in a pulse-like manner. In this case, a differential amplifier 38 receiving a reference voltage from a reference voltage source 37 monitors the voltage of the heating power source which is supplied to the bridge circuit. The output signal from the differential amplifier 38 controls the base potential of the transistor 36, thereby setting the power source voltage supplied to the bridge circuit at the reference voltage.

Figure 5A:
FIGS. 5A to 5D are timing charts for explaining the measuring operation of the airflow rate measuring unit shown in FIG. 1.
Figure 5B:
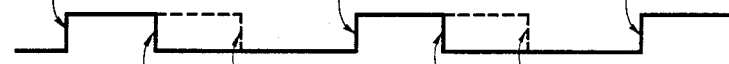
Figure 5C:

When the airflow rate of intake air flowing in the pipe 13 is measured by the unit 16, the heating start signal as shown in FIG. 5A is generated in synchronism with rotation of the engine 11. This signal sets the flip-flop circuit 34, which then produces an output signal which rises as shown in FIG. 5B. When the output signal from the circuit 34 rises in this manner, the transistor 36 is turned on and a heating current is supplied to the element 17. Then, the temperature of the element 17 rises as shown in FIG. 5C.

Figure 5D:
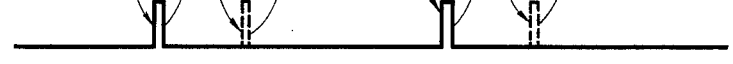

When the temperature of the element 17 is raised and its resistance is increased, the potential at the node a becomes lower than that at the node b. The output signal from the comparator 33 rises as shown in FIG. 5D, and resets the circuit 34.

When the voltage of the heating power supplied to the element 17 is the reference voltage, the temperature of the element 17 increases in correspondence with the airflow rate flowing through the pipe 13. Therefore, time required for the temperature of the element 17 to attain a predetermined difference in relation to the air temperature detected by the element 30 after supply of the heating current to the element 17 is proportional to the airflow rate inside the pipe 13. The duration of a pulse-like output signal generated in correspondence with the set/reset operation of the circuit 34 represents the measured airflow rate. This output signal is supplied to the unit 18 and is used for calculation control of the fuel injection quantity, ignition timing and the like.

Figure 6:
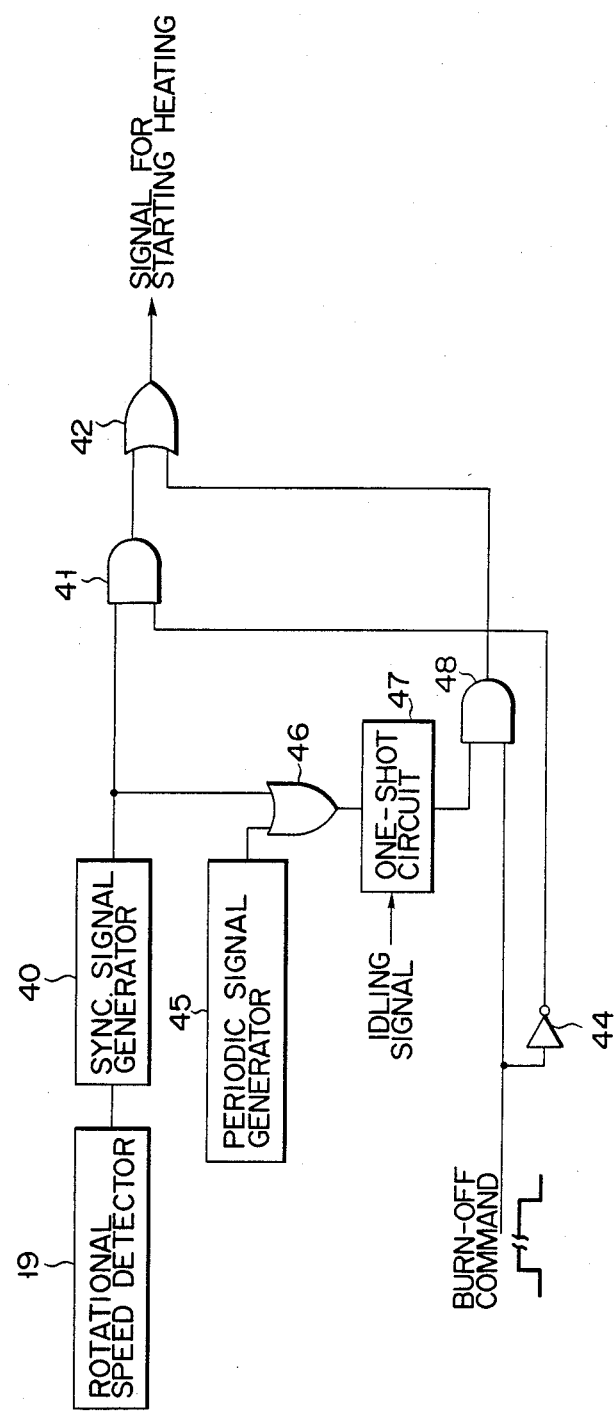
FIG. 6 is a block diagram showing an example of a means for generating a heating start signal which is supplied to the heat-generating element of the airflow rate measuring unit shown in FIG. 1.

FIG. 6 shows the circuit configuration of a portion of the unit 18 for generating a heating start signal which is supplied to the flip-flop circuit 34. In response to a specific rotational angle detection signal from the rotational speed detector 19 for detecting the rotating state of the engine 11, a sync signal generator 40 generates a rotation sync signal. The rotation sync signal is obtained as a heating start signal through an AND gate 41 and an OR gate 42. The heating start signal is supplied to the circuit 34 as a set command signal.

When dust attached to the element 17 is burnt, unlike in the case of measurement operations, a burn-off command signal is generated at a period specified by the unit 18 while the engine is stopped or in a predetermined engine operating state such as engine idling or engine deceleration. A periodic signal generator 45 generates a trigger pulse as a periodic signal which is supplied to an OR gate 46 so that burning off in the engine stop state is controlled by the periodic signal. Since the OR gate 46 also receives the rotation sync signal from the generator 40, the output signal from the OR gate 46 is supplied to a one-shot circuit 47 as a start signal. When the burning off is performed in the engine idling or deceleration state, only one of the signals from the signal generators 40 and 45 is necessary.

Every time a signal is received from the OR gate 46, the one-shot circuit 47 generates a pulse signal having a preset duty ratio. The pulse signal is supplied to an AND gate 48.

The one-shot circuit 47 sets a time duration suitable for burning off dust attached to the element 17. This time duration is set to be long enough with respect to the duration of the heating current during the measurement operation. The duration of the pulse signal generated by the generator 47 is set to be suitable for burning off dust on the element 17. Dust burn-off is performed while the engine 11 is in the idling or stop state, and the generator 45 is driven while the engine 11 is stopped. When the engine 11 is at an idling speed, an idling signal is supplied to the circuit 47. While the idling signal is being supplied, the time constant of a time constant circuit for setting the duration of the pulse from the generator 47 is changed so that the duty ratio of the output pulse signal will be different from that during the stop state of the engine 11. More specifically, when the idling signal is supplied to the one-shot circuit 47, the duty ratio and duration of the pulse signal generated by the circuit 47 are set to be larger than in the stop state of the engine 11. In the idling state, since intake airflows into the pipe 13, due to the heat-radiating effect of this airflow, the duty ratio and duration of the pulse signal are increased in order to heat the element 17 to a temperature sufficient to burn off the dust.

A burn-off command signal is supplied to the AND gate 48. The burn-off command signal is generated when the engine 11 is stopped or in the idling state, or by manual switch operation. The burn-off command signal is also supplied to an inverter 44. The inverter 44 supplies a gate signal to the AND gate 41 when no burn-off command signal is supplied.

In the measuring state, no burn-off command signal is generated, a gate signal is supplied to the AND gate 41, and a heating start signal synchronous with the rotation of the engine 11 is generated by the OR gate 42, thereby executing the airflow rate measuring operation.

Conversely, when a burn-off command is supplied, a gate signal is supplied to the AND gate 48 and the AND gate 41 is disabled so that a heating start signal for measurement synchronous with the engine rotation is not generated. In this state, an output signal from the one-shot circuit 47 is produced from the OR gate 42 and the flip-flop circuit 34 is set.

In this case, while the set command signal is supplied, even if a reset command signal is supplied, the flip-flop circuit 34 is kept set, thus constituting a level trigger-type flip-flop. Therefore, when the time duration of the output signal from the OR gate 42 extends to a duration during which an output signal is generated from the comparator 33 after the element 17 is heated, it is extended until the signal from the OR gate 42 falls. Thus, the heating current is supplied to the element 17 for a time duration corresponding to that of the pulse signal generated by the one-shot circuit 47. Consequently, the element 17 is heated to a temperature for burning off the dust and the dust is burnt away.

FIGS. 7A to 7D show the airflow rate measuring state and the burn-off state of the airflow rate measuring unit 16. FIG. 7A shows the temperature state of the heat-generating element 17. In the airflow rate measuring mode, the element 17 is heated to about 170° C. However, in the burn-off mode, the element 17 is heated to about 800° C.

FIG. 7B shows the heating current supplied to the element 17 so as to control it in the manner described above. The heating current is controlled by the heating start signal generated from the OR gate 42 as shown in FIG. 7C and the output signal generated from the comparator 33 as shown in FIG. 7D. In this case, the output signal from the comparator 33 is generated when the element 17 is at the temperature (170° C.). This signal is supplied to the flip-flop circuit 34 as a reset signal so as to control the fall timing of the heating current supplied to the element 17. In the burn-off mode, since the temperature of the element 17 is sufficiently higher than the temperature (170° C.), the reset command is kept supplied to the circuit 34. However, since the circuit 34 is a level trigger-type flip-flop, the heating current supplied to the element 17 is controlled in response to the output signal from the one-shot circuit 47.

In the airflow rate measuring mode during the normal operation of the engine 11, the duty ratio of the heating current supplied to the element 17 is 3.3% to 8.3% at 500 rpm engine speed and 13% to 50% at 8,000 rpm engine speed. When a heating start signal as in the measurement state is supplied in the engine stop state, since heat is radiated from the element 17, a small duty ratio is set.

In the burn-off mode, a 5 ms period signal, for example, is generated by the generator 45. When burning off is performed after engine is stopped, the circuit 47 generates a signal of 60% duty ratio having an effective level of 3 ms and an ineffective level of 2 ms so as to control the heating current supplied to the element 17. When burning off is performed in the idling state, a signal having a duty ratio of 65% to 75% is generated by the circuit 47 in correspondence with the periodic signal synchronous with the rotation of the engine 11 in the idling state.

Further, when burning off is performed in the decelerating condition in which no fuel injection is required, the duty ratio of the signal is set above 75%.

In the airflow rate measuring unit 16 having the arrangement described above, the heating start signal for controlling rise of the heating current supplied to the element 17 is a signal of short duration only for setting the circuit 34 in the airflow rate measuring mode. However, in the burn-off mode, a signal of a duration for allowing the element 17 to generate sufficient heat to burn off the dust attached thereon is supplied as a heating start signal. In this manner, special control is not performed in each of the airflow rate measuring and burn-off modes. Only the state of the heating start signal is controlled. Therefore, special wiring for burn-off control is not required for the airflow rate measuring unit 16.

When the control means as shown in FIG. 6 is realized in the microcomputer of the engine control unit 18, burn-off temperature corresponding to mileage traveled since the previous burn-off operation can also be set. The burn-off temperature can be controlled by the duration of the heating start signal generated in the burn-off control mode. When the burn-off command signal is a duration-controlled signal, the AND gate 48 generates a heating start signal which has a duration whose maximum value is set by the one-shot circuit 47 and which does not exceed the duration of the burn-off command signal. When such a burn-off temperature control means is used, in the initial period of a periodic burn-off operation, the burn-off temperature is set to be high and is gradually decreased. When such control is performed, peripheral members of the element 17 can be protected from heat, and burn-off control corresponding to each operating state can be performed by decreasing the burn-off time.

When burn-off control is performed, the longer the duration of the heating current, the higher the temperature to which the resistive element of the heat generating element 17 is heated. Temperature Tb and resistance Rh of the element 17 are determined by the duty ratio of the heating current and are given by:

$$(V^2/Rh) \cdot D = C \cdot hA \, (Ta - Tb)$$

where

V: voltage across the two ends of the element 17
D: duty ratio of the heating current
h: thermal conductivity
A: heat conductive area of the element 17
Ta: air temperature
C: constant In the airflow rate measuring unit, explanation has been made of supplying a heating electric power which has been set to a constant voltage to the heat-generating element 17. However, it is also possible to measure an airflow rate by the same means as shown in the above-mentioned embodiment even if a heating electric power from a constant current source is supplied to the heat-generating element.

What is claimed is:

1. A control apparatus for an internal combustion engine having means for measuring an intake airflow rate as means for detecting an operating state of the engine, comprising:

heat generating means which is fixed in an intake pipe of the engine and a heating operation of which is controlled by a heating current supplied thereto, said heat generating means comprising an element having a temperature characteristic according to which resistance changes in accordance with temperature;

first heating start signal generating means for periodically generating a first heating start signal so as to control rising of the heating current supplied to said heat generating means;

comparing means for detecting the temperature of the heat-generating element so as to detect when the temperature of the heat-generating element is increased beyond a predetermined temperature, a comparison output from said comparing means controlling the heating current supplied to said heat generating means;

measurement signal output means for generating a signal having a duration corresponding to the heating current supplied to said heat generating means, the signal from said measurement signal output means being used as an intake airflow rate signal of said internal combustion engine;

second heating start signal generating means for repeatedly generating a burn-off control signal each having a duration longer than heating current duration in a measurement mode; and burn-off control means for supplying, independently of the comparison output from said comparing means, the heating current to said heat generating means for a duration corresponding to the duration of the signal generated by said second heating start signal generating means, thereby increasing the temperature of said element beyond the temperature thereof in the measurement mode.

2. An apparatus according to claim 1, wherein said first heating start signal generating means comprises engine rotation sync signal generating means in rotation detecting means of said internal combustion engine.

3. An apparatus according to claim 1, wherein said second heating start signal generating means generates the burn-off control signal in a stop state of said internal combustion engine.

4. An apparatus according to claim 1, wherein said second heating start signal generating means generates the burn-off control signal in a predetermined operating state of said internal combustion engine.

5. An apparatus according to claim 1, wherein said second heating start signal generating means includes periodic signal generating means for generating a periodic signal and generates the burn-off control signal in correspondence with the periodic signal generated by said periodic signal generating means.

6. An apparatus according to claim 5, wherein said periodic signal generating means comprises a periodic signal generator for generating a signal having a predetermined period, and generates the burn-off control signal in correspondence with an output signal from said periodic signal generating means.

7. An apparatus according to claim 5, wherein said periodic signal generating means includes detecting means for detecting a rotation sync signal of said internal combustion engine, the burn-off control signal being generated in synchronism with rotation of said internal combustion engine.

8. An apparatus according to claim 1, wherein said second heating start signal generating means includes periodic signal generating means, pulse signal generating means, started by a periodic signal generated by said periodic signal generating means, for generating a pulse signal having a preset effective duration, and means for outputting the pulse signal as the second heating start signal in response to the burn-off control signal; and the second heating start signal continuously sets the heating current supplied to said heat generating means without being influenced by an output from said comparing means.

9. An apparatus according to claim 1, wherein said first and second heating start signal generating means comprise means for generating a rotation sync signal synchronous with rotation of said internal combustion engine, means for generating a periodic signal corresponding to a burn-off heating period, pulse signal generating means, started by the rotation sync signal or the periodic signal, for generating a pulse signal having a preset effective duration, and logic means for outputting the rotation sync signal as the first heating start signal when a burn-off command signal is not detected and for outputting an output signal from said pulse signal generating means as the second heating start signal when the burn-off command signal is detected.

* * * * *